United States Patent
Shibata et al.

[11] Patent Number: 5,426,735
[45] Date of Patent: Jun. 20, 1995

[54] DATA COMMUNICATION DEVICE CAPABLE OF ADDING DATA IDENTIFICATION CODE TO EACH DATA BYTE

[75] Inventors: Kohichi Shibata, Sakai; Shigenori Motooka, Nishinomiya, both of Japan

[73] Assignee: Mita Industrial Co., Ltd., Osaka, Japan

[21] Appl. No.: 152,949

[22] Filed: Nov. 12, 1993

Related U.S. Application Data

[63] Continuation of Ser. No. 711,475, Jun. 5, 1991, abandoned.

[30] Foreign Application Priority Data

Jun. 11, 1990 [JP] Japan .................................. 2-153612

[51] Int. Cl.⁶ .................... G06F 13/38; G06F 11/10; H04J 3/14
[52] U.S. Cl. ................... 395/200; 370/94.1; 371/37.1
[58] Field of Search ................. 371/37.1; 370/94.1

[56] References Cited

U.S. PATENT DOCUMENTS

| | | | |
|---|---|---|---|
| 4,589,109 | 5/1986 | Chambers | 370/94.1 |
| 4,654,853 | 3/1987 | Moriyama et al. | 371/41 |
| 4,665,517 | 5/1987 | Widmer | 370/85.15 |
| 4,759,053 | 7/1988 | Satomi et al. | 379/100 |
| 4,845,667 | 7/1989 | Hoptner et al. | 364/424.01 |
| 4,924,463 | 5/1990 | Thomas et al. | 370/105.4 |
| 4,975,915 | 12/1990 | Sako et al. | 371/37.4 |
| 5,081,621 | 1/1992 | Sugimoto | 370/85.13 |

FOREIGN PATENT DOCUMENTS 62-96829 11/1989 Japan .
2162854 6/1990 Japan .

*Primary Examiner*—Parshotam S. Lall
*Assistant Examiner*—Viet Vu
*Attorney, Agent, or Firm*—Jordan and Hamburg

[57] ABSTRACT

A data communication device includes an identification code generator for generating code indicative of the kind of data. A transfer data generator generates transfer data in the form at least two kinds of data. The transfer data generator adds the identification code to the generated data. A controller controls the identification code generator and the transfer data generator to output the generated transfer data at a predetermined time.

16 Claims, 2 Drawing Sheets

DATA COMMUNICATION DEVICE CAPABLE OF ADDING DATA IDENTIFICATION CODE TO EACH DATA BYTE

This application is a continuation of application Ser. No. 07/711,475 filed Jun. 5, 1991 now abandoned.

BACKGROUND OF THE INVENTION AND RELATED ART STATEMENT

The present invention relates to a data communication device, and more particularly to a data communication device provided with unit for generating transfer data having an identification code and another unit for identifying the kind of received data based on the identification code thereof.

Conventionally, there has been known a First-In-First-Out type buffer (hereinafter referred to as a FIFO) as a buffer to be provided between a plurality of data communication devices. Transfer data to be stored in the buffer is 9-bit data formed by adding a parity bit to 8-bit (1-byte) information data or command data.

Furthermore, there has been known a packet transfer method as a method for transferring a great mass of data. According to the packet transfer method, data to be transferred are divided into a number of small groups which are in turn transferred by the packet.

According to the conventional method for transferring the 9-bit data, when transferred data is received, a bit pattern of the data is collated with a predetermined bit pattern so as to discriminate whether the received data is command data or information data. Accordingly, when a great mass of data are received, it takes much time to identify the kind of each data. Thus, a throughput of the data communication device will be lowered.

When some of data transferred in a great mass are damaged during a transfer process, for example, information data is distorted into command data, the subsequent data cannot normally be received. Consequently, the predetermined data processing may not be carried out.

On the other hand, according to the packet transfer method, a header is added to each packet. Accordingly, when some of the data being transferred is damaged, although all the data in the packet including the damaged data are damaged, data of the other packets are not subject to the damage caused by the damaged data. However, the addition of the header to each packet inevitably increases the number of data to be transferred.

SUMMARY OF THE INVENTION

In view of the foregoing drawbacks, it is an object of the present invention to provide a data communication device which can assure higher communication speed and more reliable signal communication.

A data communication device of the present invention comprises identification code generating means for generating identification code indicative of the kind of data, transfer data generating means for generating transfer data by generating each of at least two kinds of data, and adding the identification code indicative of the kind of the generated data to the generated data, and control means for controlling the identification code generating means and the transfer data generating means so as to output the generated transfer data at a predetermined time.

In the present invention, the identification code indicative of the kind of data is generated, and is added to data to be transferred so as to generate transfer data. Accordingly, the identification of the kind of data can be executed based on the identification code added to the generated data. Consequently, the kind of data can be identified with more ease. Thus, data communication can be practiced at higher speeds.

These and other objects, features and advantages of the present invention will become more apparent upon a reading of the following detailed description and accompanying drawings.

DETAILED DESCRIPTION OF PREFERRED EMBODIMENT OF THE INVENTION

Preferred embodiments of the present invention will be described with reference to drawings in which it should be noted that like numerals designate like parts.

Figure 1:
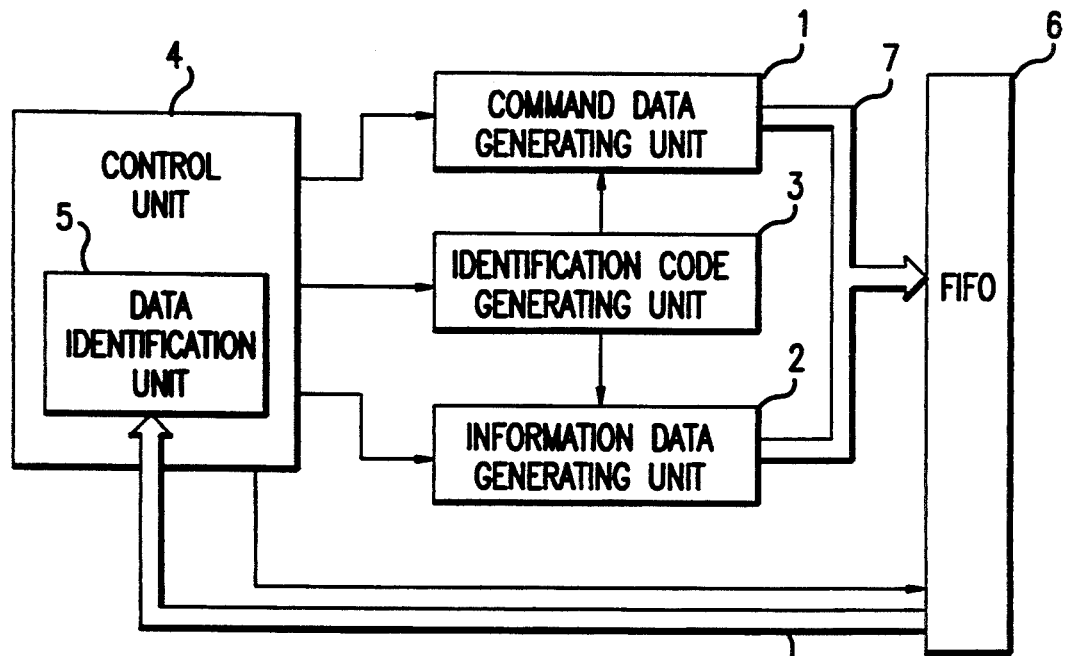
FIG. 1 is a block diagram showing an entire construction of a first data communication device of the invention.

FIG. 1 is a block diagram showing an entire construction of a data communication device embodying the invention as a first embodiment. The first data communication device comprises a command data generating unit 1, an information data generating unit 2, an identification code generating circuit 3, and a control unit 4. The control unit 4 has a data identification unit 5. The command data generating unit 1 and the information data generating unit 2 are connected to the FIFO 6 by way of a data bus 7.

The command data generating unit 1 is adapted for generating command data and then adding identification code to the command data to generate transfer command data. The information data generating unit 2 is adapted for generating information data and then adding the identification code to the information data to generate transfer information data. The identification code generating unit 3 is adapted for generating the identification code and sending the identification code to the command data generating unit 1 and the information data generating unit 2. The control unit 4 is adapted for controlling the command data generating unit 1, the information data generating unit 2, and the identification code generating unit 3 so as to send the generated transfer command data and information data to the FIFO 6. The data identification unit 5 provided in tire control unit 4 is adapted for identifying the kind of received data.

Transfer of data is executed in the following manner. First, the control unit 4 sends a control signal to the command data generating unit 1. Upon receipt of the control signal from the control unit 4, the command data generating unit 1 generates command data consisting of 8 bits. Simultaneously, the control unit 4 sends another control signal to the identification code generating unit 3. Upon receipt of the control signal from the control unit 4, the identification code generating unit 3 generates an identification code indicative of command data and sends the same to the command data generating unit 1. The identification code consists of 1 bit.

Upon receipt of the identification code from the identification code generating unit 3, the command data generating unit 1 adds the 1-bit identification code to the 8-bit command data to generate a frame of transfer command data consisting of 9 bits. Thereafter, the frame of 9-bit transfer command data is sent in parallel form from the command data generating unit 1 to the FIFO 6 through the data bus 7. The frame of transfer command data is temporarily stored in the FIFO 6.

Next, the control unit 4 sends another control signal to the information data generating unit 2. Upon receipt of the control signal from the control unit 4, the information data generating unit 2 generates information data consisting of 8 bits. Simultaneously, the control unit 4 sends another control signal to the identification code generating unit 3. Upon receipt of the control signal from the control unit 4, the identification code generating unit 3 generates another identification code indicative of information data and sends the same to the information data generating unit 2. The identification code consists of 1 bit.

Upon receipt of the identification code from the identification code generating unit 3, the information data generating unit 2 adds the 1-bit identification code to the 8-bit information data to generate a frame of transfer information data consisting of 9 bits. Thereafter, the frame of 9-bit transfer information data is sent in parallel form from the information data generating unit 2 to the FIFO 6 through the data bus 7. The frame of transfer information data is temporarily stored after the frame of transfer command data in the FIFO 6.

Figure 2:
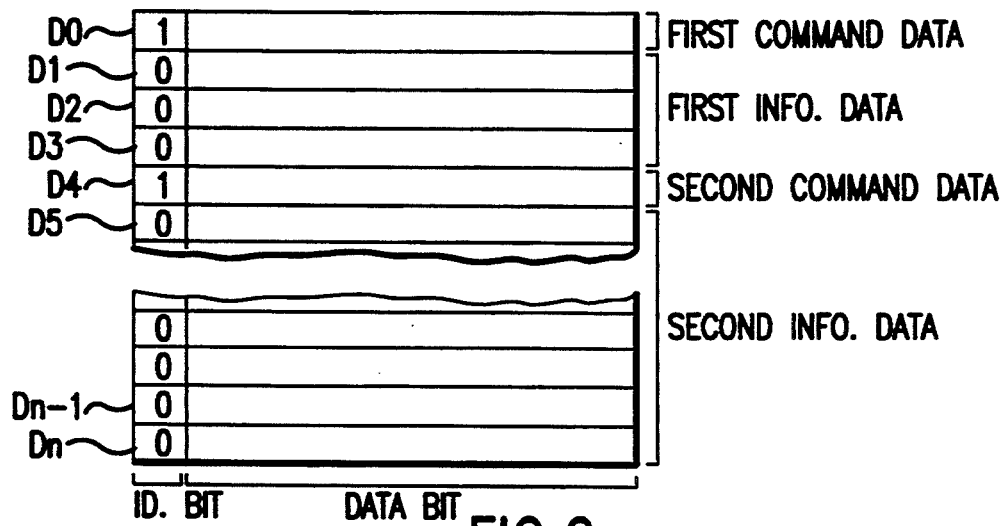
FIG. 2 is a diagram showing a configuration of transfer data transferred between the two first data communication devices.

FIG. 2 shows, as an example, a configuration of a transfer data sent from this data communication device to the FIFO 6. In this transfer data, the ninth bit, or the most significant bit, for each frame of transfer command data or transfer information data, is assigned as the identification code for one frame of transfer data. Each frame of transfer data is sent from the most significant bit thereof. In this embodiment, the identification code for each frame of transfer command data is set to "1" and the identification code for transfer information data is set to "0". Accordingly, it could be seen that transfer data frames D0 and D4 carry respectively first and second command data. Transfer data frames D1 to D3 carry information data in connection with the first command data. Transfer data frames D5 to Dn carry information data in connection with the second command data.

In this embodiment, receipt of transfer data from the FIFO 6 is executed as follows. First, the control unit 4 sends a request signal to the FIFO 6 which in turn sends the stored transfer data to the data identification unit 5 through a data bus 8. The sending sequence is identical to the storing sequence in which the transfer data frames are stored in the FIFO 6. The data identification unit 5 identifies based on the identification code represented by the most significant bit of each transfer data frame whether the transfer data frame is command data frame or information data frame, and then executes an appropriate processing in accordance with the identification result. For example, in the case where the transfer data shown in FIG. 2 is received, the transfer data frames D1 to D3 are determined as information data in connection with the first command data. Similarly, the transfer data frames D5 to Dn are determined as information data in connection with the second command data. These data may be temporarily stored in a memory. Alternatively, a predetermined operation may be executed in accordance with the command data and information data.

Figure 3:
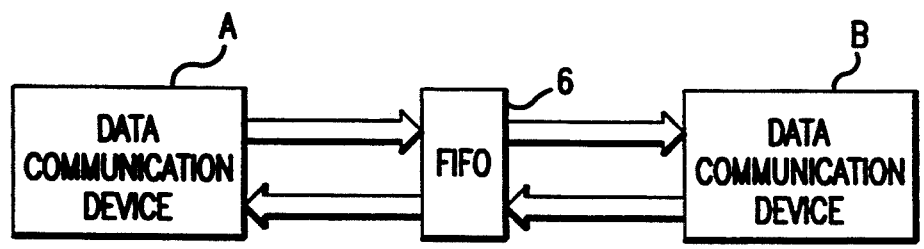
FIG. 3 is a block diagram showing a data communication system constructed by the two first data communication devices.

FIG. 3 is a block diagram showing a data communication system constructed by the two first data communication devices A and B, and the FIFO 6. Between the data communication devices A and B, for example, the following data communication is carried out. In the case where data is transferred from the data communication device A to the data communication device B, transfer command data and transfer information data generated in the above-mentioned manner are sent from the data communication device A in a predetermined sequence to the FIFO 6, and temporarily stored therein. The control unit 4 provided in the data communication device B first sends the request signal to the FIFO 6, so that the transfer command data and information data temporarily stored in the FIFO 6 are sent in the same sequence as the storing sequence from the FIFO 6 to the data communication device B. Transfer of data from the data communication device B to the data communication device A is executed in the reverse direction. Accordingly, this data communication system can practice bidirectional data communication.

In this embodiment, one transfer data frame is generated by adding the identification code to the command data or the information data to be transferred. On the receiving end, the identification is executed based on the identification code included in each transfer data frame whether the received transfer data frame is command data or information data. Then, the transfer data frame is processed in accordance with the result of identification. In this way, the transfer data frame can be identified easily and quickly. Thus, the transfer of data can be executed at higher speeds.

Also, transfer data frames are grouped into a number of data blocks, each data block consisting of a command data frame and information data frames. These information data frames combinedly form information data in connection with command data of the command data frame. Accordingly, even if the identification code of a frame of one data block is damaged, only the data block becomes invalid but the other data blocks can remain valid. For example, in the transfer data shown in FIG. 2, if the identification code of the transfer information data frame D2 is distorted, by a certain cause, to "1" which indicates command data, only the data block consisting of the transfer data frames D0 to D3 is determined to be erroneous data. The subsequent data blocks are normally processed. Accordingly, in the case where a great mass of transfer data are to be sent or received between the data communication devices, the number of the transfer data subject to the damage caused by one damaged transfer data frame can be greatly reduced.

Furthermore, a bit assigned as a parity bit in the conventional data is assigned as the identification bit, or the identification code to the transfer data. Consequently, the transfer data can easily be generated, which thus needs no additional costs to add the identification code to command data or information data.

Figure 4:
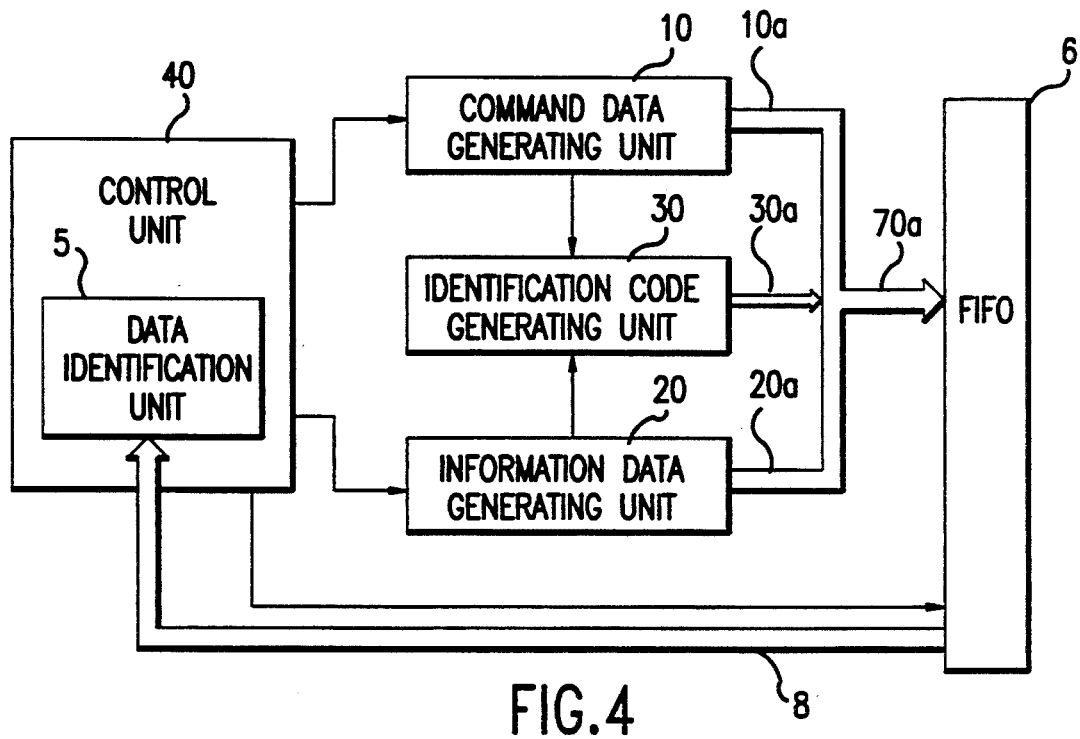
FIG. 4 is a block diagram showing an entire construction of a second data communication device.

FIG. 4 is a block diagram showing an entire construction of a second data communication device of the invention. The second data communication device comprises a command data generating unit 10, an information dater generating unit 20, an identification code generating circuit 30, and a control unit 40. This data communication device is connected to a FIFO 6.

The command data generating unit 10, the information data generating unit 20, and the identification data generating unit 30 are connected to the FIFO 6 by way of a data bus. The data bus consists of a command data bus 10a, an information data bus 20a, an identification code data bus 30a, and a transfer data bus 70a. The command data bus 10a and the information data bus 20a each has eight signal lines. The identification code data bus 30a has one signal line. The transfer data bus 70a has nine signal lines. The command data bus 10a, the information data bus 20a, and the identification code data bus 30a are combined into the transfer data bus 70a.

Specifically, first, the control unit 40 sends a control signal to the command data generating unit 10. Upon receipt of the control signal, the command data generating unit 10 generates command data consisting of 8 bits and sends the generated command data in parallel form to the FIFO 6 through the command data bus 10a and the transfer data bus 70a. At the same time, the command data generating unit 10 sends a control signal to the identification code generating unit 30. The identification code generating unit 30 generates an identification code indicative of command data and sends the same to the FIFO 6 through the identification data bus 30a and the transfer data bus 70a. A frame of transfer command data of 9 bits is generated in the transfer data bus 70a and sent to the FIFO 6. The frame of transfer command data is temporarily stored in the FIFO 6.

Next, the control unit 40 sends another control signal to the information data generating unit 20. Upon receipt of the control signal, the information data generating unit 20 generates and sends information data consisting of 8 bits in parallel form to the FIFO 6 through the information data bus 20a and the transfer data bus 70a. Simultaneously, the information data generating unit 20 sends a control signal to the identification code generating unit 30. Upon receipt of the control signal from the information data generating unit 20, the identification code generating unit 30 generates another identification code indicative of information data and sends the same to the FIFO 6 through the identification code data bus 30a and the transfer data bus 70a. A frame of transfer information data of 9 bits is generated in the transfer data bus 70a and sent to the FIFO 6. The frame of transfer information data is temporarily stored after the frame of transfer command data in the FIFO 6.

The sequence of transfer command data frames and transfer information data frames is determined by timing of the control signal sent from the control unit 40.

Figure 5:
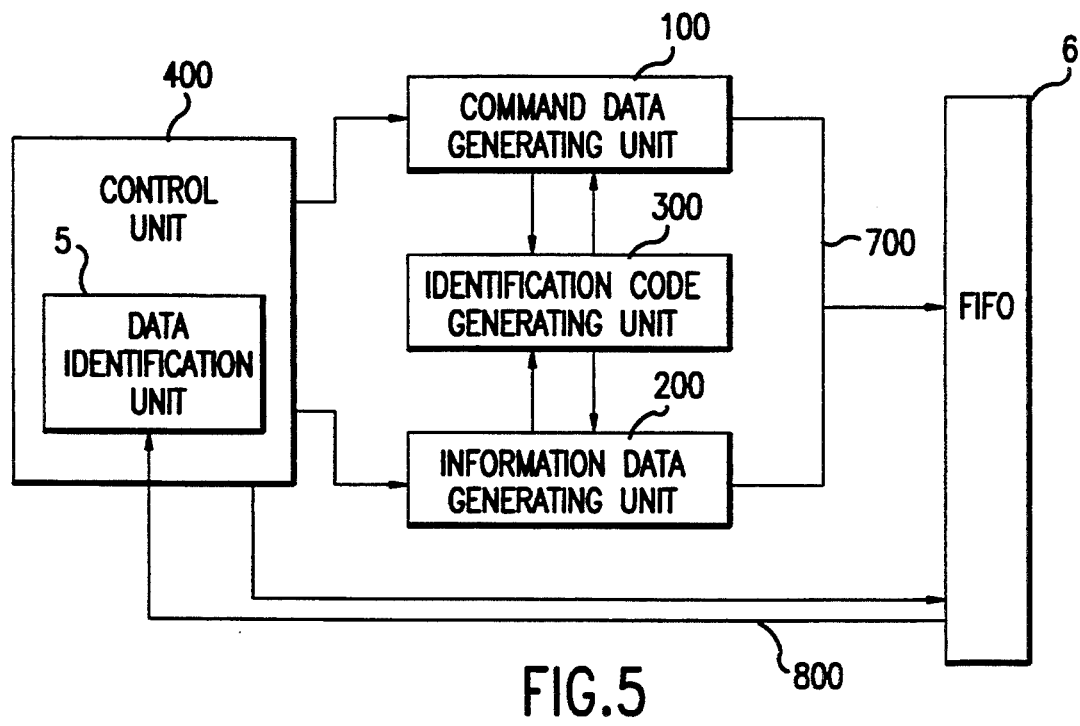
FIG. 5 is a block diagram showing an entire construction of a third data communication device.

FIG. 5 is a block diagram showing an entire construction of a third data communication device of the invention. In the third embodiment, generated command data and information data are sent in serial form to a FIFO 6. The third data communication device comprises a command data generating unit 100, an information data generating unit 200, an identification code generating circuit 300, and a control unit 400. The control unit 400 has a data identification unit 5. The command data generating unit 100 and the information data generating unit 200 are connected to the FIFO 6 by way of a signal line 700.

Specifically, first, the control unit 400 sends a control signal to the command data generating unit 100. Upon receipt of the control signal, the command data generating unit 100 generates command data consisting of 8 bits, and also sends a request signal to the identification code generating unit 300 which in turn generates and sends an identification code indicative of command data to the command data generating unit 100. The identification code consists of 1 bit. The command data generating unit 100 adds the received identification code of 1 bit to the already generated 8-bit command data to generate a frame of transfer command data which is then sent in serial form to the FIFO 6 through the signal line 700. The frame of transfer command data is temporarily stored in the FIFO 6.

Next, the control unit 400 sends a control signal to the information data generating unit 200. Upon receipt of the control signal, the information data generating unit 200 generates information data consisting of 8 bits, and also sends a request signal to the identification code generating unit 300 which in turn generates and sends an identification code indicative of information data to the information data generating unit 200. The identification code consists of 1 bit. The information data generating unit 200 adds the received identification code of 1 bit to the already generated 8-bit information data to generate a frame of transfer information data which is then sent in serial form to the FIFO 6 through the signal line 700. The frame of transfer information data is temporarily stored in the FIFO 6.

The sequence of transfer command data frames and transfer information data frames is determined by controlling the timing of the control signal sent from the control unit 400.

As described above, in these embodiments of the present invention, identification code is added to each transfer data frame. It is identified only based on the identification code added to each transfer data frame whether the transfer data frame is command data or information data. Accordingly, the kind of the transfer data frame can easily be identified and the transfer data can be read at higher speeds.

Although the ninth bit of each transfer data frame is assigned as the identification code in the above embodiments, it will be apparent that any bit constituting each transfer data frame may be assigned as the identification code.

Moreover, data communication is effected between the two data communication devices in the above embodiments. However, it may be appropriate that data communication is effected between three data communication devices or more.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A data communication device for generating a series of transfer data including a first group of a first type of data and a second type of data following the first type of data and a second group of said first type of data, each of said first and second types of data including at least one data unit, each data unit consisting of a fixed number of bits, said device comprising:

identification code generating means for generating an identification code having a predetermined number of bits and indicating the kind of data of each data unit;

data generating means for generating said data units by generating data units each of which has said fixed number of bits of a respective kind of data, said data generating means further comprising means for adding the identification code indicative of the kind of the data of each data unit at positions prior to a leading bit of the data of the respective data unit;

control means for controlling the identification code generating means and the data generating means to output the generated data units of the respective kind of data with the respective identification code at a predetermined time; and data identification means for:
  receiving the series of transfer data,
  identifying the kind of data of each data unit based on the identification code added thereto, and
  dividing the series of transfer data, based on the identification code added thereto, into groups.

2. A data communication device as defined in claim 1 wherein the control means comprises means for sending a control signal to the data generating means to start the generation of data units of said first and second kinds of data, and means for sending another control signal to the identification code generating means to control the identification code generating means to generate and output the identification code corresponding to the respective data to the data generating means in synchronism with the generation of the data units.

3. A data communication device as defined in claim 1 wherein the control means comprises means for sending a control signal to the data generating means to start the generation of data units thereby, and the data generating means comprises means for generating and outputting the data units, and the control means further comprises means for sending, at the same time, a control signal to the identification code generating means to generate and output the identification code corresponding to the data of the respective data unit in synchronism with the outputting of the data units so that the outputted data units and the outputted identification code form transfer data.

4. A data communication device as defined in claim 1 wherein the control means comprises means for sending a control signal to the data generating means to start the generation of data units, and the data generating means comprises means for sending a control signal to the identification code generating means to generate and output the identification code corresponding to the data of the respective data unit to the data generating means, and means for generating transfer data by adding the received identification code to the generated data units, said data generating means outputting the generated transfer data.

5. A data communication device as defined in claim 1 wherein the data generating means includes first data generating means for generating first data units of said first kind of data and second data generating means for generating second data units of said second kind of data, the control means comprising means for controlling the first data generating means and the second data generating means to output the first data units and the second data units in a predetermined sequence.

6. A data communication device of claim 1 wherein said predetermined number is one.

7. The data communication device of claim 1 wherein said data generating means comprises means for generating data units that are eight bits long.

8. The data communication device of claim 7 wherein said identification code generating means comprises means for generating identification code that is one bit long.

9. A data communication device for generating a block of series transfer data including at least two groups of command data, and at least one group of information data separating at least two of said groups of command data, each of said groups including at least one data unit, each data unit consisting of a fixed number of bits, said device comprising:

identification code generating means for generating an identification code having a predetermined number of bits and indicating the kind of data of each data unit;

data generating means for generating said data units by generating data units each of which has said fixed number of bits of a respective kind of data, said data generating means further comprising means for adding the identification code indicative of the kind of the data of each data unit at positions prior to a leading bit of the data of the respective data unit;

control means for controlling the identification code generating means and the data generating means to output the generated data units of the respective kind of data with the respective identification code at a predetermined time; and data identification means for:
  receiving the block of series transfer data,
  identifying the kind of data of each data unit based on the identification code added thereto, and
  dividing the block of series transfer data, based on the identification codes added thereto, into said groups.

10. A data communication device as defined in claim 9 wherein the control means comprises means for sending a control signal to the data generating means to start the generation of data units of said first and second kinds of data, and means for sending another control signal to the identification code generating means to control the identification cede generating means to generate and output the identification code corresponding to the respective data to the data generating means in synchronism with the generation of the data units.

11. A data communication device as defined in claim 9 wherein the control means comprises means for sending a control signal to the data generating means to start the generation of data units thereby, and the data generating means comprises means for generating and outputting the data units, and the control means further comprises means for sending, at the same time, a control signal to the identification code generating means to generate and output the identification code corresponding to the data of the respective data unit in synchronism with the outputting of the data units so that the outputted data units and the outputted identification code form transfer data.

12. A data communication device as defined in claim 9 wherein the control means comprises means for sending a control signal to the data generating means to start the generation of data units, and the data generating means comprises means for sending a control signal to the identification code generating means to generate and output the identification code corresponding to the data of the respective data unit to the data generating means, and means for generating transfer data by adding the received identification code to the generated data units, said data generating means outputting the generated transfer data.

13. A data communication device as defined in claim 9 wherein the data generating means includes first data generating means for generating first data units of said first kind of data and second data generating means for generating second data units of said second kind of data, the control means comprising means for controlling the first data generating means and the second data generating means to output the first data units and the second data units in a predetermined sequence.

14. A data communication device of claim 9 wherein said predetermined number is one.

15. A data communication device of claim 9 wherein said data generating means comprises means for generating data units that are eight bits long.

16. A data communication device of claim 15 wherein said identification code generating means comprises means for generating identification code that is one bit long.

* * * * *